(12) United States Patent
Eggert et al.

(10) Patent No.: US 11,952,817 B2
(45) Date of Patent: Apr. 9, 2024

(54) FASTENING SYSTEM FOR FASTENING A COMPONENT, COMPONENT ARRANGEMENT, AND AIRCRAFT

(71) Applicant: Airbus Operations GmbH, Hamburg (DE)

(72) Inventors: Philipp Eggert, Gummersbach (DE); Bogdan-Florin Marculescu, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 276 days.

(21) Appl. No.: 17/615,067

(22) PCT Filed: Jul. 10, 2020

(86) PCT No.: PCT/EP2020/069558
§ 371 (c)(1),
(2) Date: Nov. 29, 2021

(87) PCT Pub. No.: WO2021/013583
PCT Pub. Date: Jan. 28, 2021

(65) Prior Publication Data
US 2022/0220783 A1    Jul. 14, 2022

(30) Foreign Application Priority Data
Jul. 19, 2019  (DE) .................. 102019119643.4

(51) Int. Cl.
*E05D 3/06* (2006.01)
*B64C 1/06* (2006.01)
*E05D 3/12* (2006.01)
*E05D 3/18* (2006.01)

(52) U.S. Cl.
CPC .............. *E05D 3/125* (2013.01); *B64C 1/069* (2013.01); *E05D 3/18* (2013.01);
(Continued)

(58) Field of Classification Search
CPC ................................. E05D 3/18; E05D 3/125
See application file for complete search history.

(56) References Cited

U.S. PATENT DOCUMENTS

| 4,490,883 | A | * | 1/1985 | Gauron | .................. | E05D 15/58 |
| | | | | | | 16/361 |
| 5,201,831 | A | * | 4/1993 | Higgins | ................. | B64C 1/066 |
| | | | | | | 244/119 |

(Continued)

FOREIGN PATENT DOCUMENTS

| GB | 496829 A | 12/1938 |
| GB | 2450251 A | 12/2008 |
| WO | 2008130124 A1 | 10/2008 |

OTHER PUBLICATIONS

J. Dankert "Technische Mechanik" Springer Fachmedien Wiesbaden GmbH 2011; 11 pages.

*Primary Examiner* — Jason W San
(74) *Attorney, Agent, or Firm* — Greer, Burns & Crain, Ltd.

(57) ABSTRACT

A fastening system including a structure holding element fastenable to a structural component. The fastening system includes a component holding element fastenable to a component to be fastened and movable relative to the structure holding element between first and second operating positions. A first lever element is connected to the structure holding element to be rotatable about a first rotation axis and is connected to the component holding element to be rotatable about a second rotation axis. The fastening system includes a connection element, connected to the component holding element to be rotatable about a third rotation axis and connected to the structure holding element to be displaceable in translation relative to the structure holding element, such that the second rotation axis, when the component holding element is transferred from its first into its (Continued)

second operating position, is displaced in a plane extending perpendicularly to the second rotation axis.

16 Claims, 3 Drawing Sheets

(52) U.S. Cl.
CPC ... *E05Y 2201/626* (2013.01); *E05Y 2201/684* (2013.01); *E05Y 2900/502* (2013.01)

(56) References Cited

U.S. PATENT DOCUMENTS

| | | | | |
|---|---|---|---|---|
| 7,883,057 | B2* | 2/2011 | Lewis | B64C 1/066 244/129.1 |
| 8,296,906 | B2* | 10/2012 | Wisniewski | E05D 3/14 16/302 |
| 8,477,486 | B2* | 7/2013 | Yang | G06F 1/1624 16/334 |
| 8,967,569 | B2* | 3/2015 | Hsu | F16M 11/10 248/920 |
| 9,376,846 | B2* | 6/2016 | Aral | E05D 7/00 |
| 2003/0046794 | A1* | 3/2003 | Muir | E05D 15/44 16/366 |
| 2005/0223524 | A1* | 10/2005 | Muir | E05D 15/30 16/366 |
| 2010/0231111 | A1* | 9/2010 | Kang | E05D 3/022 312/405 |
| 2015/0250315 | A1* | 9/2015 | Gross | H05K 5/0017 361/679.01 |
| 2016/0009356 | A1* | 1/2016 | Mariat | B64C 1/066 244/119 |
| 2020/0002987 | A1* | 1/2020 | Lottinville | E05D 11/1014 |

\* cited by examiner

FASTENING SYSTEM FOR FASTENING A COMPONENT, COMPONENT ARRANGEMENT, AND AIRCRAFT

CROSS-REFERENCES TO RELATED APPLICATIONS

This application claims the benefit of the International Application No. PCT/EP2020/069558, filed on Jul. 10, 2020, and of the German patent application No. 102019119643.4 filed on Jul. 19, 2019, the entire disclosures of which are incorporated herein by way of reference.

FIELD OF THE INVENTION

The invention relates to a fastening system which is particularly suitable for mounting a component, in particular a ceiling panel, in an aircraft. Furthermore, the invention relates to a component arrangement equipped with such a fastening system. Lastly, the invention relates to an aircraft equipped with such a fastening system and/or such a component arrangement.

BACKGROUND OF THE INVENTION

In modern commercial aircraft, a large number of lines, such as electrical lines and lines for the aircraft air conditioning system, are usually laid in the ceiling region of the cabin behind ceiling panels that upwardly delimit a passenger region of the cabin. Furthermore, the region of the cabin behind the ceiling panels is used as installation space for various components, in particular electronic components. In order to make these lines and components accessible for repair or maintenance work, the ceiling panels must be removed from their mounting position, which they occupy during normal operation of the aircraft. In addition, components can also be integrated into the ceiling panels themselves, the repair or maintenance of which requires disassembly of the ceiling panels. Depending on the arrangement of the ceiling panels within the aircraft cabin, disassembly of the ceiling panels can be complicated by fixtures adjacent to the ceiling panels, such as monuments.

SUMMARY OF THE INVENTION

The invention is directed to an object of providing a fastening system which is suitable for mounting a component, in particular a ceiling panel, in such a way that the component can be easily dismantled if necessary in order to make a space located behind the component accessible, for example for repair or maintenance work. Furthermore, the invention is directed to an object of providing a component arrangement equipped with such a fastening system as well as an aircraft equipped with such a fastening system and/or such a component arrangement.

A fastening system comprises a structure holding element which is fastenable to a structural component. Furthermore, the fastening system comprises a component holding element which is fastenable to a component that is to be fastened. For example, the structure holding element can be provided for fastening to a structural component, which can be in the form of a primary structural component of an aircraft or in the form of a structural component connected to the primary structure of the aircraft in a load-transmitting manner. The component holding element, on the other hand, can be provided for fastening to a component designed, for example, in the form of an aircraft interior component, in particular a ceiling panel. The component holding element is movable relative to the structure holding element between a first operating position and a second operating position.

When the component holding element is disposed relative to the structure holding element in its first operating position, a component connected to the component holding element is preferably in a normal operating position. When the component connected to the component holding element is an aircraft ceiling panel, the component in its normal operating position can be disposed in a conventional manner in the ceiling region of an aircraft cabin and can separate a component installation space located between the component and an aircraft outer skin from a passenger region of the aircraft cabin. By contrast, a component connected to the component holding element can be in an access operating position when the component holding element is disposed in its second operating position relative to the structure holding element. In its access position, a component designed in the form of an aircraft ceiling panel preferably provides access from the passenger region of the aircraft cabin to the component installation space located between the component and the aircraft outer skin. This allows repair and maintenance work to be carried out on the components installed in the component installation space.

The fastening system comprises a first lever element connected to the structure holding element so as to be rotatable about a first rotation axis. Furthermore, the first lever element is connected to the structure holding element so as to be rotatable about a second rotation axis. In particular, the first lever element can be connected in the region of a first end to the structure holding element so as to be rotatable about the first rotation axis. By contrast, the first lever element is preferably connected in the region of a second end, opposite the first end, to the component holding element so as to be rotatable about the second rotation axis. When the component holding element is transferred from its first operating position into its second operating position, the first lever element is preferably rotated about the first rotation axis relative to the structure holding element, as well as about the second rotation axis relative to the component holding element.

Lastly, the fastening system comprises a connection element which, just like the first lever element, is connected both to the component holding element and to the structure holding element. The connection element is connected to the component holding element so as to be rotatable about a third rotation axis. Preferably, when the component holding element is transferred from its first operating position into its second operating position, the connection element performs a rotation about the third rotation axis. The first, second, and third rotation axes can extend substantially parallel to each other.

By contrast, the connection element is connected to the structure holding element so as to be displaceable in translation relative to the structure holding element, in such a way that, when the component holding element is transferred from its first operating position into its second operating position, the second rotation axis is displaced in a plane extending perpendicularly to the second rotation axis. Accordingly, a component connected to the component holding element and mounted on a structural component in the ceiling region of an aircraft by means of the fastening system can also be displaced in the plane extending perpendicularly to the second rotation axis when the component holding element is transferred from its first operating position into its second operating position and simultaneously can be rotated or pivoted about the second rotation axis relative to the structure holding element. In this way, the component can then be transferred from its normal operating position into its access position in a simple and convenient manner even if elements installed adjacent to the component, such as monuments or the like, restrict the freedom of movement of the component during the transfer from its normal operating position into its access position and would, for example, impede a pure pivoting movement of the component about the second rotation axis of the fastening system.

The connection element can be connected to the structure holding element so as to be displaceable in translation relative to the structure holding element, in such a way that the second rotation axis is moved along an arcuate path of movement in the plane when the component holding element is transferred from its first operating position into its second operating position. A portion of a component connected to the component holding element and mounted on a structural component in the ceiling region of an aircraft by means of the fastening system can then also be moved along an arcuate path of movement relative to the structure holding element when the component holding element is transferred from its first operating position into its second operating position. At the same time, the component can be rotated or pivoted about the second rotation axis relative to the structure holding element.

Furthermore, the connection element can be connected to the structure holding element so as to be displaceable in translation relative to the structure holding element, in such a way that, when the component holding element is transferred from its first operating position into its second operating position, a first distance between the first and second rotation axes decreases in a first direction perpendicular to the second rotation axis and a second distance between the first and second rotation axes increases in a second direction perpendicular to the second rotation axis and the first direction. In other words, the connection element can perform a movement in translation relative to the structure holding element when the component holding element is transferred from its first operating position into its second operating position, whereby a region of the component holding element connected to the connection element is removed from the structure holding element. As a result, the first distance between the first and second rotation axes increases in the first direction perpendicular to the second rotation axis.

At the same time, the rotary movement of the first lever element about the first rotation axis and the rotary movement of the first lever element about the second rotation axis result in the second rotation axis approaching the first rotation axis in the second direction perpendicular to the second rotation axis and the first direction. Accordingly, when the component holding element is transferred from its first operating position into its second operating position, a component connected to the component holding element and mounted on a structural component in the ceiling region of an aircraft by means of the fastening system can be moved away from the structural component (downwards) and moved toward the first rotation axis in the first direction (forwards) simultaneously with its rotation about the second rotation axis in the second direction.

The connection element is preferably connected to the structure holding element so as to be displaceable in translation relative to the structure holding element, in such a way that a path of movement in translation, along which the connection element is displaced relative to the structure holding element during a transfer of the component holding element from its first operating position, intersects an extension of the first rotation axis. This allows a compact design of the fastening system.

The structure holding element can comprise a base element. Furthermore, the structure holding element can comprise a second lever element. The first lever element can be connected to the second lever element so as to be rotatable about the first rotation axis, that is to say, the first lever element can be connected to the structure holding element so as to be rotatable about the first rotation axis via the second lever element. Preferably, when the structure holding element is transferred from its first operating position into its second operating position, an angle defined between the first and second lever elements increases. For example, the angle defined between the first and second lever elements can be between 50 and 70°, particularly about 60°, when the component holding element is in its first operating position. By contrast, the angle defined between the first and second lever elements can be between 100 and 120°, particularly about 110°, when the component holding element is in its second operating position. However, the angles defined between the first and second lever elements in the first and second operating positions of the component holding element are design parameters that can be adjusted according to circumstances, such as the dimensions of the component to be connected to the component holding element and the desired range of movement of the component holding element relative to the structure holding element.

The second lever element can be rigidly connected to the base element. Alternatively, the second lever element can also be integrated with the base element. For example, the second lever element can comprise two arms that can be connected to each other by the first rotation axis in the region of their free ends facing away from the base element.

The base element can comprise a first portion connected to the second lever element. Furthermore, the base element can comprise a second portion extending substantially perpendicularly to the first portion. For example, the second lever element can extend from a first surface of the first portion of the base element facing the second portion of the base element. The first portion of the base element can furthermore have a second surface opposite its first surface, which second surface preferably extends substantially parallel to the first surface. The second portion of the base element can likewise have a second surface opposite its first surface. When the structure holding element is fastened to a structural component, the second surface of the second portion of the base element can bear against the structural component while the first surface of the base element faces away from the structural component and faces the first portion of the base element. Preferably, the first and second surfaces of the second portion of the base element extend substantially parallel to each other.

Preferably, at least a portion of the connection element is displaceably received in a guide rail formed on the structure holding element. The guide rail can comprise at least one groove that cooperates with a protrusion provided on the connection element to guide the movement of the connection element relative to the structure holding element. Additionally or alternatively, at least one protrusion that cooperates with a groove formed on the connection element to guide the movement of the connection element relative to the structure holding element can also be provided on the guide rail.

Preferably, the guide rail is attached to the second portion of the base element and, in particular, on the first surface of the second portion of the base element of the structure holding element. For guiding the movement in translation of the connection element relative to the structure holding element in such a way that the second rotation axis is displaced in the plane perpendicular to the second rotation axis when the structure holding element is transferred from its first operating position into its second operating position, the guide rail preferably likewise extends in the plane perpendicular to the second rotation axis. In particular, if the connection element is connected to the structure holding element so as to be displaceable in translation relative to the structure holding element in such a way that the path of movement in translation along which the connection element is displaced relative to the structure holding element during a transfer of the component holding element from its first operating position intersects an extension of the first rotation axis, the guide rail preferably also intersects the extension of the first rotation axis.

The component holding element preferably comprises a base plate, which can have a first surface and a second surface opposite the first surface. When the component holding element is fastened to a component, the second surface of the base plate can bear against the component while the first surface of the base plate faces away from the component. The first and second surfaces of the base plate preferably extend substantially parallel to each other.

Furthermore, the component holding element can comprise a first receiving means connected to the first lever element. Preferably, the first receiving means extends from the first surface of the base plate of the component holding element, facing away from the component, when the component holding element is fastened to a component. Lastly, the component holding element can comprise a second receiving means connected to the connection element, which second receiving means can extend from the first surface of the base plate of the component holding element, similarly to the first receiving means.

When the component holding element is transferred from its first operating position into its second operating position, an angle that the first lever element forms with the base plate of the component holding element preferably increases. For example, the angle that the first lever element forms with the base plate of the component holding element can increase from about 30° to about 65° when the component holding element is transferred from its first operating position into its second operating position. By contrast, transferring the component holding element from its first operating position into its second operating position preferably results in a decrease in the angle that the connection element forms with the base plate of the component holding element. For example, the angle that the connection element forms with the base plate of the component holding element can decrease from about 80° to about 25°. However, the angles defined between the first lever element or the connection element and the base plate of the component holding element in the first and second operating positions of the component holding element are design parameters that can be adjusted according to the circumstances, for example, the dimensions of the component to be connected to the component holding element and the desired range of movement of the component holding element relative to the structure holding element.

The first receiving means preferably comprises two arms extending substantially parallel to each other. In the region of their free ends facing away from the base plate of the component holding element, the arms of the first receiving means are preferably connected to one another by the second rotation axis. By contrast, the second receiving means can comprise only one arm, which, in the region of its free end facing away from the base plate of the component holding element, is connected to the connection element.

Preferably, the fastening system further comprises a locking system configured to releasably lock the structural component in its normal operating position. In a preferred embodiment of the fastening system, the fastening system or at least one fastening system is configured the component to the structural component in the region of a first edge portion of the component. Depending on the dimensions, i.e., the length, of the first edge portion of the component, a plurality of fastening systems can be provided along the first edge portion of the component. The locking system is then preferably configured to releasably lock the component in its normal operating position in the region of a second edge portion of the component, opposite the first edge portion of the component.

The locking system can comprise a first locking element which is connectable to the component in the region of the second edge portion of the component. Furthermore, the locking system can comprise a second locking element complementary to the first locking element and attachable to a structural component. The structural component can be a component of the primary structure of an aircraft, but can also be a component connected to the primary structure of the aircraft in a load-transmitting manner Depending on the dimensions, i.e., the length of the second edge portion of the component, a plurality of locking systems can be provided along the second edge portion of the component.

Unlocking the locking system causes the component to be released, i.e., the second edge portion of the component is released from the structural component. This allows the second edge portion of the component to pivot relative to the structural component. If the component is a ceiling panel, the component pivots downward relative to the structural component upon release of the locking system. However, in the region of its first edge portion, the component remains fixed to the structural component by the fastening system. However, the kinematics of the fastening system are activated in such a way that the component holding element of the fastening system is transferred from its first operating position into its second operating position. As a result, the component, as described above, is also moved away from the structural component (downwards) in the second direction simultaneously with its rotation about the second rotation axis and is moved in the first direction (forwards) towards the first rotation axis from its normal operating position into its access position.

The fastening system can further comprise a holding band having a first end and a second end. The first end of the holding band can be connectable to the component. The second end of the holding band, on the other hand, can be connectable to a structural component. The structural component can be the same structural component to which the second locking element of the locking system is also connectable. Alternatively, however, the second end of the holding band can be attachable to a different structural component. The holding band is preferably configured to limit the movement of the component relative to the structural component when the component is transferred from its normal operating position into its access position.

The holding band is particularly connectable to the component in the region of the second edge portion of the component, which is opposite the first edge portion of the component connectable to the component holding element of the fastening system. The neck band can then easily limit the folding or pivoting movement that the component performs relative to the structural component when the component is moved from its normal operating position into its access position after the locking system has been unlocked. Preferably, the holding band is in the form of an extendable holding band. In particular, the holding band is also formed with an automatic retraction function that provides for automatic shortening of the holding band when the component is moved back again from its access position into its normal operating position.

A component arrangement comprises a component and a structural component. The component is fastened to the structural component by means of a fastening system described above so as to be movable between a normal operating position and an access position. In particular, the component fastened to the structural component by means of the fastening system can be moved from its normal operating position into its access position by transferring the component holding element of the fastening system from its first operating position into its second operating position. For example, the component can be a ceiling panel provided for mounting in an aircraft cabin. In particular, the ceiling panel can be provided for installation in a door region of an aircraft. The structural component can be a part of a primary structure of the aircraft or a structural component fastened to the primary structure of the aircraft in a load-transmitting manner.

Preferably, the fastening system connects the component to the structural component in the region of the first edge portion of the component. The locking system and/or the holding band of the fastening system, on the other hand, preferably connect the component to one or more structure component(s) in the region of the second edge portion of the component opposite the first edge portion.

An aircraft comprises an above-described fastening system and/or an above-described component arrangement.

BRIEF DESCRIPTION OF THE DRAWINGS

Preferred exemplary embodiments of the invention will now be explained in more detail with reference to the accompanying schematic drawings, wherein.

DETAILED DESCRIPTION OF THE PREFERRED EMBODIMENTS

Figure 3:
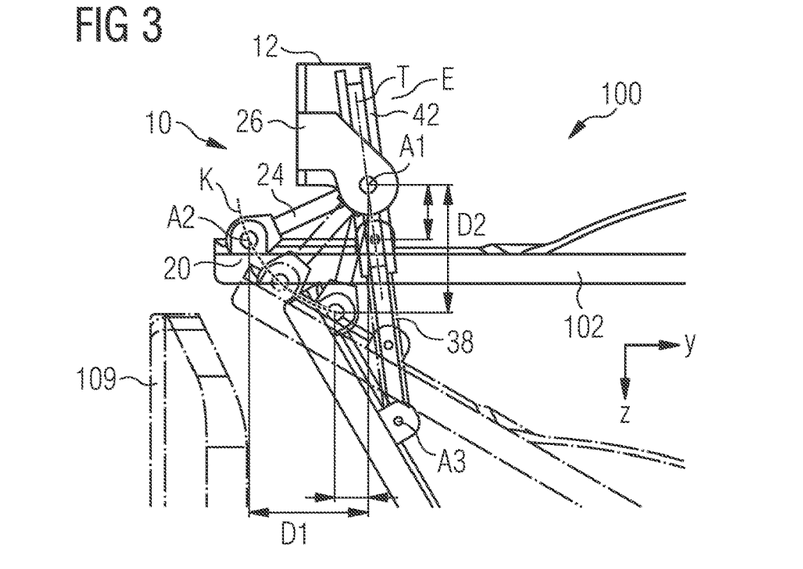
FIG. 3 illustrates the transfer of the component holding element of the fastening system from its first operating position into its second operating position.
Figure 4:
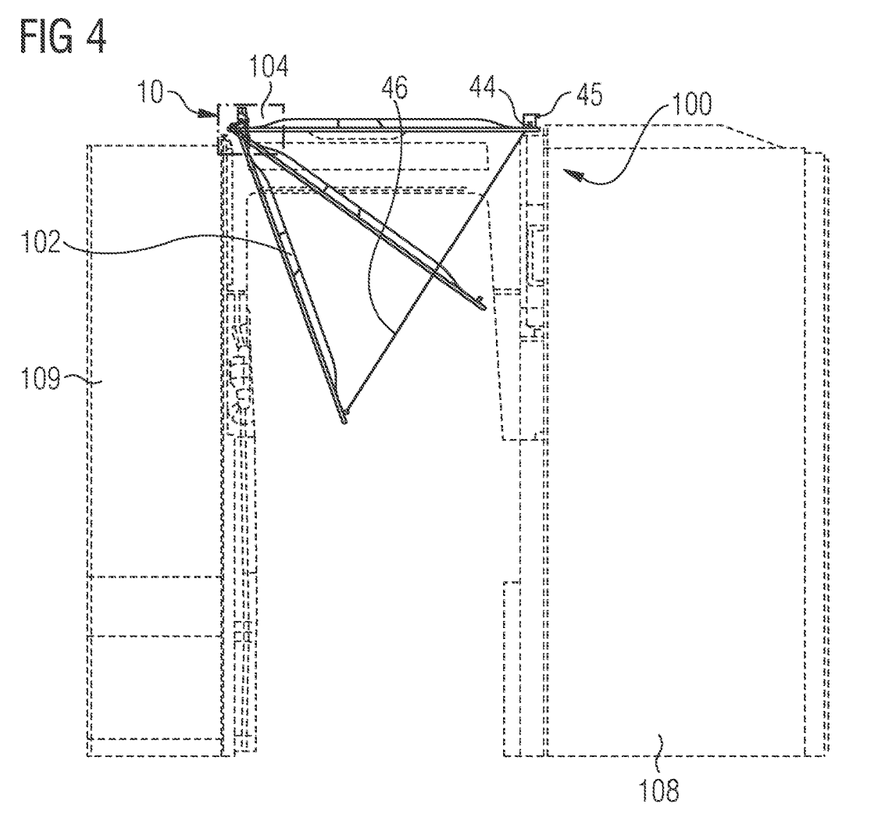
FIG. 4 illustrates the transfer of the component from its normal operating position into its access position.
Figure 5:
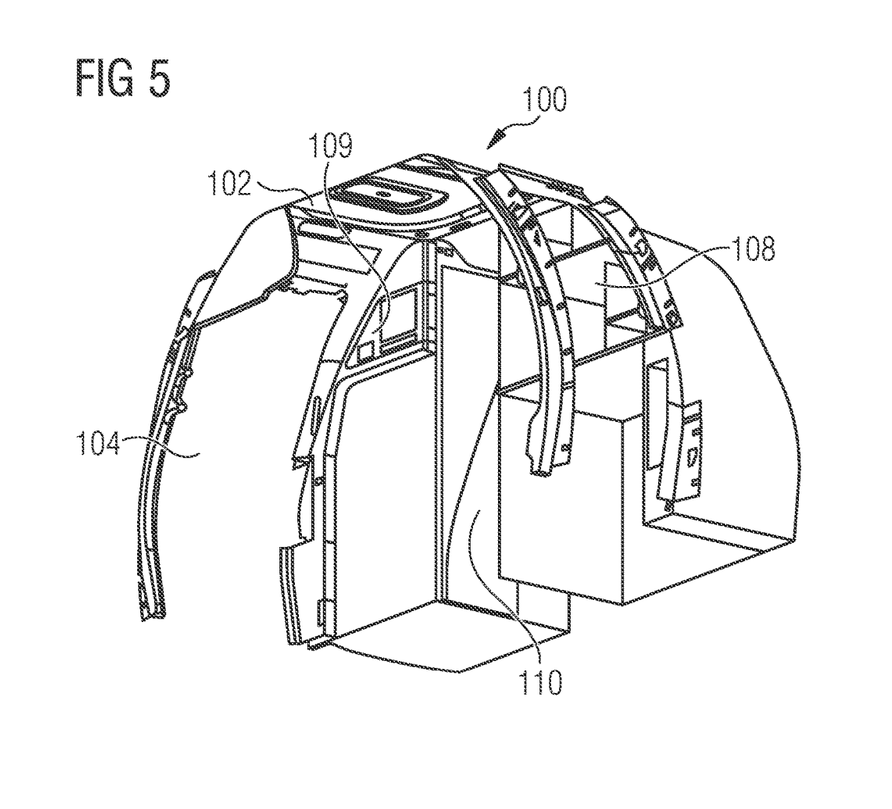
FIG. 5 shows an installation environment of the component arrangement according to FIG. 1 in an aircraft.
Figure 6:
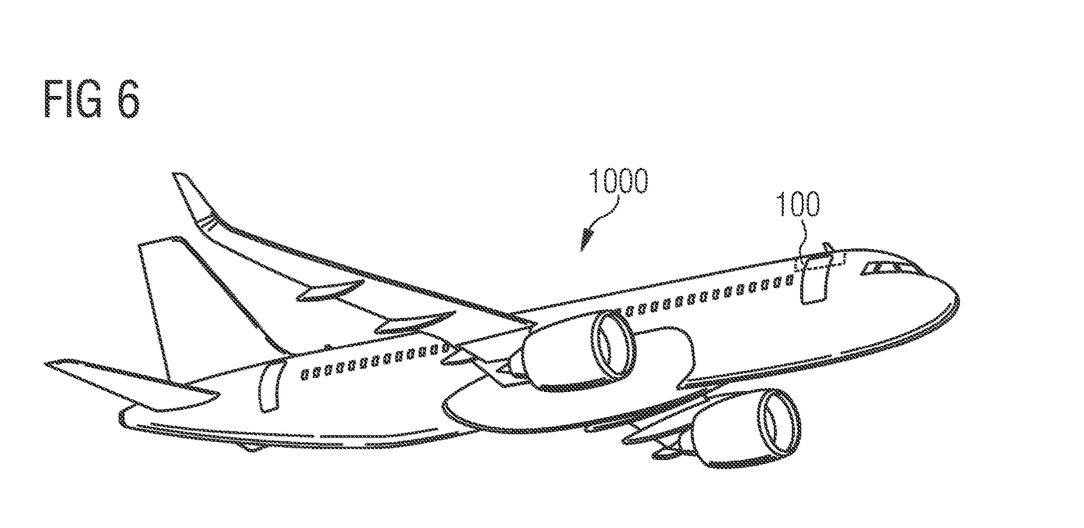
FIG. 6 shows an aircraft equipped with a component arrangement according to FIG. 1.

FIGS. 1 to 5 each show a component arrangement 100 comprising a component 102, a structural component 104, and a fastening system 10. In the component arrangement 100, the fastening system 10 serves to connect the aircraft interior component 102, for example designed in the form of a ceiling panel, to the structural component 104. The structural component 104 can be a component of a primary structure of an aircraft 1000 equipped with the component arrangement 100 (see FIG. 6). Alternatively, however, the structural component 104 can also be a structural component 104 that can be fastened to the primary structure of the aircraft 1000 in a load-transmitting manner. As best seen in FIG. 5, the component arrangement 100 is installed in a door region of the aircraft 1000, i.e., in a region of a cabin ceiling adjacent to a passenger door 106. The door region of the aircraft 1000 further incorporates a galley 108, a partition wall 109, and a sanitary module 110, such that only very limited assembly space is available for disassembly of the component 102 for repair and/or maintenance purposes.

The fastening system 10 comprises a structure holding element 12 which is fastenable to the structural component 104, as shown in FIGS. 3 and 4. The structure holding element 12 comprises a base element 14 with a first portion 16 and a second portion 18 extending substantially perpendicularly to the first portion 16. The first portion 16 of the base element 14 comprises a first surface facing the second portion 18 of the base element 14 and a second surface opposite its first surface and preferably extending substantially parallel to the first surface. Correspondingly, the second portion 18 of the base element 14 comprises a first surface facing the first portion 16 of the base element 14 and a second surface opposite its first surface and extending substantially parallel to the first surface. In the assembled state of the component arrangement 100, that is, when the structure holding element 12 is attached to the structural component 104, as shown in the figures, the second surface of the second portion 18 of the base element 14 bears against the structural component 104, whereas the first portion 16 of the base element 14 extends substantially perpendicularly from the structural component 104.

Furthermore, the fastening system 10 comprises a component holding element 20 which is fastenable to the component 102 that is to be fastened. The component holding element 20 comprises a base plate 22 which has a first surface and a second surface opposite the first surface and extending substantially parallel to the first surface. When the component holding element 20 is fastened to the component 102, as shown in the figures, the second surface of the base plate 22 bears against the component while the first surface of the base plate 22 faces away from the component 102.

The fastening system 10 further comprises a first lever element 24 which is connected to the structure holding element 12 so as to be rotatable about a first rotation axis A1. Furthermore, the first lever element 24 is connected to the component holding element 20 so as to be rotatable about a second rotation axis A2. In particular, in the region of a first end, the first lever element 24 is connected to a second lever element 26 of the structure holding element 12 so as to be rotatable about the first rotation axis A1. By contrast, in the region of a second end opposite the first end, the first lever element 24 is connected to the base plate 22 of the component holding element 20 so as to be rotatable about the second rotation axis A2.

The second lever element 26 of the structure holding element 12 is rigidly connected to the base element 14 of the structure holding element 12 and extends from the first surface of the first portion 16 of the base element 14 facing the second portion 18 of the base element 14. Furthermore, the second lever element 26 has two arms 28, 30 extending substantially parallel to each other, which arms are connected to each other by the first rotation axis A1 in the region of their free ends facing away from the first portion 16 of the base element 14.

For fastening the first lever element 24 to the base plate 22 of the component holding element 20, a first receiving means 32 is provided on the base plate 22 and extends from the first surface of the base plate 22 of the component holding element 20. Similarly to the second lever element 26, the first receiving means 32 also has two arms 34, 36 extending substantially parallel to each other, which arms are connected to each other by the second rotation axis A2 in the region of their free ends facing away from the base plate 22 and engage around the second end of the first lever element 24 in order to securely connect the first lever element 24 to the component holding element 20.

Furthermore, the fastening system 10 comprises a connection element 38. The connection element 38, similarly to the first lever element 24, is connected both to the component holding element 20 and to the structure holding element 12. In particular, the connection element 38 is connected to the component holding element 20 so as to be rotatable about a third rotation axis A3. For the connection of the connection element 38 to the component holding element 20, a second receiving means 40 is provided on the component holding element 20 and extends from the first surface of the base plate 22 of the component holding element 20. Unlike the first receiving means 32, the second receiving means 40 is formed with only one arm and is passed through by the third rotation axis A3. In the embodiment of a fastening system 10 shown in the figures, the first, second and third rotation axes A1, A2, A3 extend substantially parallel to each other.

By contrast, the connection element 38 is connected to the structure holding element 12 such that the connection element 38 is displaceable in translation relative to the structure holding element 12 in a plane E that extends substantially perpendicularly to the second rotation axis A2. In order to enable a guided displacement in translation of the connection element 38 relative to the structure holding element 12, a guide rail 42 is provided on the structure holding element 12, in which guide rail there is received at least one portion of the connection element 38.

The guide rail 42 is formed on the second portion 18 of the base element 14, that is to say, on the first surface of the second portion 18 of the base element 14, and thus extends in the plane E substantially perpendicular to the second rotation axis A2. Furthermore, the guide rail 42 is fastened to the second portion 18 of the base element 14 in such a way that the guide rail intersects an extension of the first rotation axis A1. The guide rail 42 has two rail elements extending substantially parallel to each other. One of the rail elements is formed integrated with the second portion 18 of the base element 14, while the other of the rail elements is formed separately from the second portion 18 of the base element 14 and is attached to the first surface of the second portion 18 of the base element 14. A groove is provided in each of the rail elements and cooperates with a complementary protrusion provided on the connection element 38.

As can best be seen from FIG. 4, the component 102 of the component arrangement 100 is connected by means of the fastening system 10 to the structural component 104 in the region of a first edge portion of the component 102. If necessary, a plurality of fastening systems 10 can be provided along the first edge portion of the component 102.

The fastening system 10 further comprises a locking system 44, shown only schematically in FIG. 4, which is used to releasably lock the component 102 in the region of a second edge portion opposite the first edge portion of the component 102. The locking system 44 comprises a first locking element connectable to the component 102 in the region of the second edge portion of the component 102. Furthermore, the locking system comprises a second locking element which is complementary to the first locking element and which is attachable to a structure component 45. The structure component 45 can be a component of the primary structure of the aircraft 1000, but can also be a component connected to the primary structure of the aircraft 1000 in a load-transmitting manner. If desired, a plurality of locking systems 44 can also be provided in the arrangement 100 along the second edge portion of the component 102.

Lastly, the fastening system 10 comprises a holding band 46 with a first end and a second end. The first end of the holding band 46 is connectable to the component 102. In particular, the holding band is connectable to the component 102 in the region of the second edge portion of the component 102, which is opposite the first edge portion of the component 102 connectable to the component holding element 12 of the fastening system 10. By contrast, the second end of the holding band 46 is connectable to the structural component 45. In the variant of a fastening system 10 shown in the figures, the holding band 46 is in the form of an extendable holding band 46 with an automatic retraction function.

Figure 1:
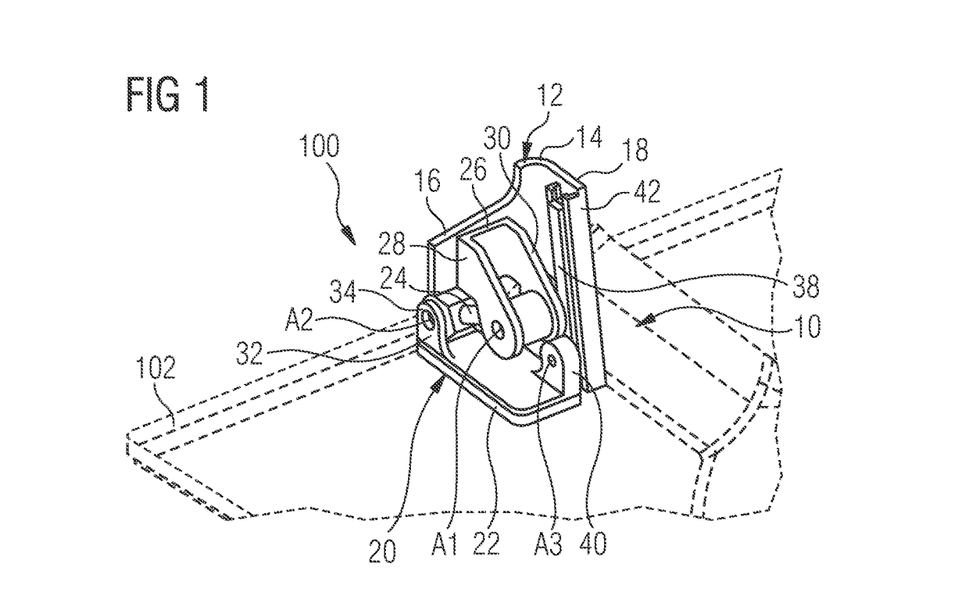
FIG. 1 shows a component arrangement with a component which is designed in the form of an aircraft ceiling panel and which is fastened to a structural component by a fastening system, wherein a component holding element of the fastening system is in a first operating position and the component is in a normal operating position.
Figure 2:
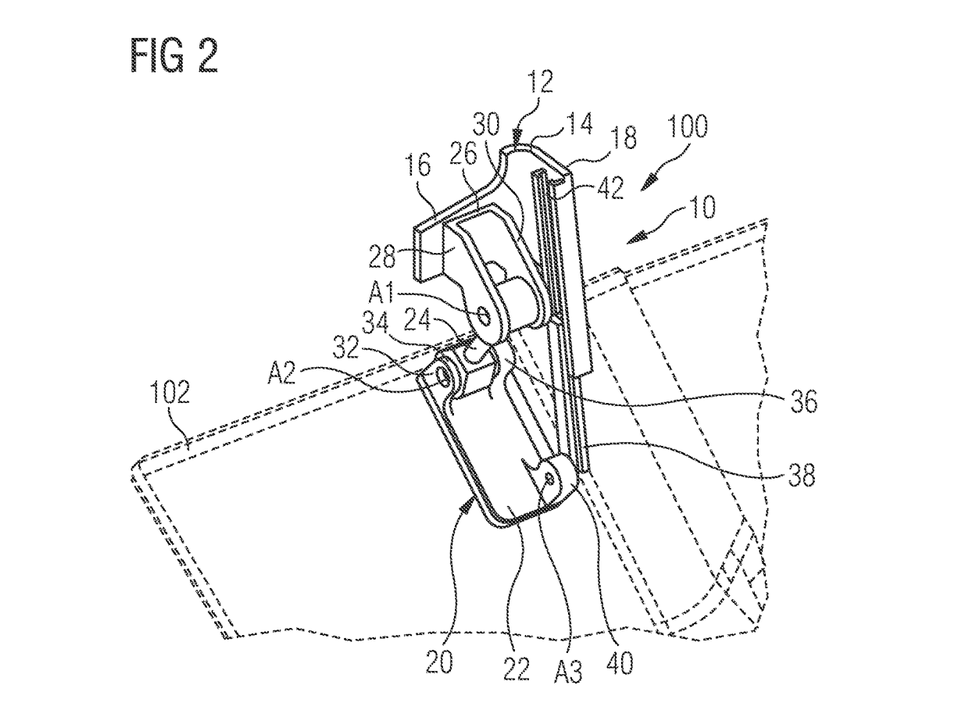
FIG. 2 shows the component arrangement according to FIG. 1, wherein, however, the component holding element of the fastening system is in a second operating position and the component is in an access position.

As best seen in FIGS. 1 to 3, the component holding element 20 is movable relative to the structure holding element 12 between a first operating position (see FIG. 1) and a second operating position (see FIG. 2). When the component holding element 20 is disposed relative to the structure holding element 12 in its first operating position, the component 102 of the component arrangement 100 connected to the component holding element 20 is in a normal operating position, separating a component installation space located between the component 102 and an aircraft outer skin from a passenger region of the aircraft cabin. The component 102 is then releasably locked in its normal operating position using the locking system 44.

By contrast, the component 102 connected to the component holding element 20 is in an access operating position when the component holding element 20 is disposed in its second operating position relative to the structure holding element 12. The locking system 44 is then unlocked, such that the second edge portion of the component 102 is released from the structural component 45. The gravity-driven, downward movement of the component 102, i.e., of the second edge portion of the component 102 relative to the structural component 104 and the structural component 45, is limited, however, by the holding band 46. In its access position, the component 102 provides access from the passenger region of the aircraft cabin to the component installation space disposed between the component 102 and the aircraft outer skin. This allows for repair and maintenance of components installed in the component installation space. If desired, the holding band 46 can also be released to allow further movement of the component holding element 102.

When the component holding element 20 is transferred from its first operating position into its second operating position, the first lever element 24 is rotated about the first rotation axis A1 relative to the structure holding element 12 or relative to the second lever element 26 of the structure element 12. Here, in the embodiment of a fastening system 10 shown in the figures, an angle defined between the first and second lever elements 24, 26 increases from about 60° to about 110°. At the same time, the first lever element 24 is rotated about the second rotation axis A2 relative to the component holding element 20. Here, in the embodiment of a fastening system 10 shown in the figures, an angle defined between the first lever element 24 and the base plate 22 of the component holding element 20 increases from about 30° to about 65°.

The connection element 38 performs a rotation about the third rotation axis A3 when the component holding element 20 is transferred from its first operating position into its second operating position. Here, in the embodiment of a fastening system 10 shown in the figures, an angle formed by the connection element 38 with the base plate 22 of the component holding element 20 increases from about 80° to about 25°.

In addition, the connection element 38, guided by the guide rail 42, is displaced in translation relative to the structure holding element 12 along a path of movement T in the plane E perpendicular to the second rotation axis A2. As a result, when the component holding element 20 is transferred from its first operating position into its second operating position, the second rotation axis A2 is also displaced in the plane E extending perpendicular to the second rotation axis A2. Correspondingly, when the component holding element 20 is transferred from its first operating position into its second operating position, the component 102 connected to the component holding element 20 is likewise displaced in the plane E extending perpendicularly to the second rotation axis A2 and simultaneously rotated or pivoted about the second rotation axis A2 relative to the structure holding element 12.

In the fastening system 10 shown in the figures, the connection element 38 is connected to the structure holding element 12 so as to be displaceable in translation relative to the structure holding element 12, in such a way that the second rotation axis A2 is moved along an arcuate path of movement K in the plane E when the component holding element 20 is transferred from its first operating position into its second operating position. Correspondingly, when the component holding element 20 is transferred from its first operating position into its second operating position, the first edge portion of the component 102 connected to the component holding element 20 is also moved along an arcuate path of movement relative to the structure holding element 12 and is simultaneously rotated or pivoted about the second rotation axis A2 relative to the structure holding element 12.

In addition, the connection element 38 is connected to the structure holding element 12 so as to be displaceable in translation relative to the structure holding element 12, in such a way that, when the component holding element 20 is transferred from its first operating position into its second operating position, a first distance D1 between the first and second rotation axes A1, A2 in a first direction y perpendicular to the second rotation axis A2 is reduced and a second distance D2 between the first and second rotation axes A1, A2 in a second direction z perpendicular to the second rotation axis A2 and the first direction y is increased. As a result, a region of the component holding element 20 connected to the connection element 38 is distanced from the structure holding element 12.

Simultaneously, the rotary movement of the first lever element 24 about the first rotation axis A1 and the rotary movement of the first lever element 24 about the second rotation axis A2 result in the second rotation axis A2 approaching the first rotation axis A1 in the second direction perpendicular to the second rotation axis A2 and the first direction. Correspondingly, when the component holding element 20 is transferred from its first operating position into its second operating position, the component 102, simultaneously with its rotation about the second rotation axis A2, is moved away from the structural component 104 in the second direction z (downwards) and is moved toward the first rotation axis A1 in the first direction y (forwards).

Lastly, the connection element 38 is connected to the structure holding element 12 so as to be displaceable in translation relative to the structure holding element 12, in such a way that the translational path of movement T along which the connection element 38 is displaced relative to the structure holding element 12 during a transfer of the component holding element 20 from its first operating position intersects an extension of the first rotation axis A1.

As is particularly evident from FIG. 4, in order to transfer the component 102 from its normal operating position into its access position, it is first necessary to unlock the locking system 44. As a result, the second edge portion of the component 102 is released from the structural component 45 and pivots downwards in a gravity-driven manner, wherein the movement of the second edge portion of the component 102 is limited by the holding band 44. At the same time, the kinematics of the fastening system 10 are activated, so that the component holding element 20 of the fastening system is transferred from its first operating position into its second operating position, as described above.

As a result, the component 102, i.e., the first edge portion of the component 102, as described above, simultaneously with its rotation about the second rotation axis A2, is also moved away from the structural component 104 (downwards) in the second direction z and moved toward the first rotation axis A1 in the first direction y (forwards) from its normal operating position into its access position. As a result, the component 102 can then be transferred from its normal operating position into its access position in a simple and convenient manner even if the elements 108, 110 installed adjacently to the component would restrict the freedom of movement of the component 102 during the transfer from its normal operating position into its access position and would, for example, hinder a mere pivoting movement of the component 102 about the second rotation axis A2 of the fastening system 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening system comprising:
   a structure holding element which is configured to be fastened to a structural component;
   a component holding element which is configured to be fastened to a component that is to be fastened and which is configured to be movable relative to the structure holding element between a first operating position and a second operating position;
   a first lever element which is connected to the structure holding element to be rotatable about a first rotation axis and which is connected to the component holding element to be rotatable about a second rotation axis; and a connection element which is connected to the component holding element to be rotatable about a third rotation axis and which is connected to the structure holding element to be displaceable in translation relative to the structure holding element, such that, when the component holding element is transferred from the first operating position into the second operating position, the second rotation axis is displaced in a plane extending perpendicularly to the second rotation axis.

2. The fastening system as claimed in claim 1, wherein the connection element is connected to the structure holding element to be displaceable in translation relative to the structure holding element, such that the second rotation axis is moved along an arcuate path of movement in the plane when the component holding element is transferred from the first operating position into the second operating position.

3. The fastening system as claimed in claim 1, wherein the connection element is connected to the structure holding element to be displaceable in translation relative to the structure holding element, such that, when the component holding element is transferred from the first operating position into the second operating position, a first distance between the first and the second rotation axis in a first direction perpendicular to the second rotation axis decreases and a second distance between the first and the second rotation axis in a second direction perpendicular to the second rotation axis and the first direction increases.

4. The fastening system as claimed in claim 1, wherein the connection element is connected to the structure holding element to be displaceable in translation relative to the structure holding element, such that a translational movement path along which the connection element is displaced relative to the structure holding element during a transfer of the component holding element from the first operating position intersects an extension of the first rotation axis.

5. The fastening system as claimed in claim 1, wherein the structure holding element comprises:
a base element, and
a second lever element,
wherein at least one of
the first lever element is connected to the second lever element so as to be rotatable about the first rotation axis,
the second lever element is rigidly connected to the base element, or
the second lever element comprises two arms extending substantially parallel to one another, which arms are connected to each other by the first rotation axis in a region of their free ends.

6. The fastening system as claimed in claim 5, wherein the base element comprises a first portion connected to the second lever element and a second portion extending substantially perpendicularly to the first portion.

7. The fastening system as claimed in claim 1, wherein at least a portion of the connection element is displaceably received in a guide rail formed on the structure holding element.

8. The fastening system as claimed in claim 6,
wherein at least a portion of the connection element is displaceably received in a guide rail formed on the structure holding element, and wherein at least one of
the guide rail is connected to the second portion of the base element,
the guide rail extends in the plane perpendicular to the second rotation axis, or
the guide rail intersects an extension of the first rotation axis.

9. The fastening system as claimed in claim 1, wherein the component holding element comprises:
a base plate,
a first receiving means connected to the first lever element, and
a second receiving means connected to the connection element.

10. The fastening system as claimed in claim 9, wherein the first receiving means comprises two arms extending substantially parallel to each other, which arms are connected to each other by the second rotation axis in a region of their free ends.

11. The fastening system as claimed in claim 1, further comprising a locking system configured to releasably lock the component in a normal operating position.

12. The fastening system as claimed in claim 1,
further comprising a holding band with a first end and a second end,
wherein the first end of the holding band is connectable to the component and the second end of the holding band is connectable to a structural component such that the holding band is configured to limit a movement of the component relative to the structural component when the component is transferred from a normal operating position into an access position.

13. A component arrangement comprising:
a component; and
a structural component, wherein the component is fastened to the structural component by at least one fastening system as claimed in claim 1 so as to be movable between a normal operating position and an access position.

14. The component arrangement as claimed in claim 13, wherein at least one of
a fastening system connects the component to the structural component in a region of a first edge portion of the component, or
at least one of the locking system or a holding band of the fastening system connects the component to a structure component in a region of a second edge portion of the component opposite the first edge portion.

15. An aircraft comprising a fastening system as claimed in claim 1.

16. An aircraft comprising a component arrangement as claimed in claim 13.

* * * * *